United States Patent
Egging et al.

(10) Patent No.: US 8,070,213 B2
(45) Date of Patent: Dec. 6, 2011

(54) MACHINE HAVING TRIM PIECE ASSEMBLY WITH REDUCED DISCORDANCE AND METHOD

(75) Inventors: Robert Egging, Oswego, IL (US); Darshit Gohel, Aurora, IL (US); Steven Wells, Aurora, IL (US)

(73) Assignee: Caterpillar Inc., Peoria, IL (US)

( * ) Notice: Subject to any disclaimer, the term of this patent is extended or adjusted under 35 U.S.C. 154(b) by 432 days.

(21) Appl. No.: 12/157,095

(22) Filed: Jun. 6, 2008

(65) Prior Publication Data

US 2009/0302645 A1  Dec. 10, 2009

(51) Int. Cl.
*B62D 29/04* (2006.01)
*B62D 25/16* (2006.01)

(52) U.S. Cl. ....... 296/181.2; 296/198; 296/29; 296/1.08
(58) Field of Classification Search ............... 296/181.2, 296/191, 193.03, 193.04, 198, 29, 1.08; 280/848, 280/153.5, 154, 849, 850
See application file for complete search history.

(56) References Cited

U.S. PATENT DOCUMENTS

| | | | | |
|---|---|---|---|---|
| 2,264,228 | A | | 11/1941 | Wagner |
| 3,879,059 | A | * | 4/1975 | Gibes ............................ 280/848 |
| 3,961,808 | A | * | 6/1976 | Dotson ......................... 280/848 |
| 4,115,974 | A | | 9/1978 | Purcell |
| 4,229,036 | A | | 10/1980 | Toda |
| 5,238,268 | A | * | 8/1993 | Logan ........................... 280/848 |
| 5,333,428 | A | | 8/1994 | Taylor et al. |
| 5,460,412 | A | | 10/1995 | Vincent et al. |
| 5,489,108 | A | | 2/1996 | Slade |
| 5,501,052 | A | | 3/1996 | Saji |
| D382,239 | S | | 8/1997 | Logan et al. |
| 5,697,644 | A | | 12/1997 | Logan et al. |
| 5,697,645 | A | | 12/1997 | Nagler |
| 5,829,786 | A | * | 11/1998 | Dahl ............................. 280/848 |
| 6,205,642 | B1 | | 3/2001 | Czirmer |
| 6,409,459 | B1 | * | 6/2002 | Ginn et al. .................... 414/685 |
| 6,558,080 | B2 | * | 5/2003 | Kozak .......................... 405/129.9 |
| 6,609,587 | B1 | * | 8/2003 | Smith et al. ................... 180/418 |
| 6,811,210 | B2 | * | 11/2004 | Granger et al. ............... 296/191 |

(Continued)

FOREIGN PATENT DOCUMENTS

| | | |
|---|---|---|
| EP | 138233 | 10/1984 |
| EP | 433794 A1 | 12/1990 |
| GB | 2151569 A | 12/1984 |

OTHER PUBLICATIONS

Machine translation of EP 0433794 printed from the internet Aug. 25, 2010.*

(Continued)

*Primary Examiner* — Jason S Morrow
(74) *Attorney, Agent, or Firm* — Liell & McNeil

(57) ABSTRACT

A method of reducing discordance among components of a molded trim piece assembly includes making each of the plurality of components according to a component configuration pattern adapted to mitigate deformation of the plurality of components, and making each of the plurality of components according to a joint configuration pattern adapted to mitigate misalignment between the plurality of components at a joint. A machine includes a molded trim piece assembly configured to amount to a body of the machine, such as to a fender of the machine, which includes a plurality of components having a component configuration pattern adapted to mitigate deformation of the plurality of components and a joint configuration pattern adapted to mitigate misalignment at a joint between the plurality of components, when mounted to the body.

11 Claims, 4 Drawing Sheets

U.S. PATENT DOCUMENTS

| | | |
|---|---|---|
| 6,948,753 B2 | 9/2005 | Yoshida et al. |
| 7,044,524 B2 * | 5/2006 | Luetze et al. ................ 296/1.08 |
| 7,112,032 B2 * | 9/2006 | Gokita .......................... 414/680 |
| 7,222,884 B2 * | 5/2007 | Callan et al. .................. 280/848 |
| 2003/0070390 A1 | 4/2003 | Dunn |
| 2010/0090500 A1 * | 4/2010 | Montineri et al. ............ 296/191 |

OTHER PUBLICATIONS

Custom Rubber Corp., Product Samples, H-Shaped Connection Seal, published on the World Wide Web prior to Feb. 1, 2008, pp. 1-2, Cleveland, Ohio.

* cited by examiner

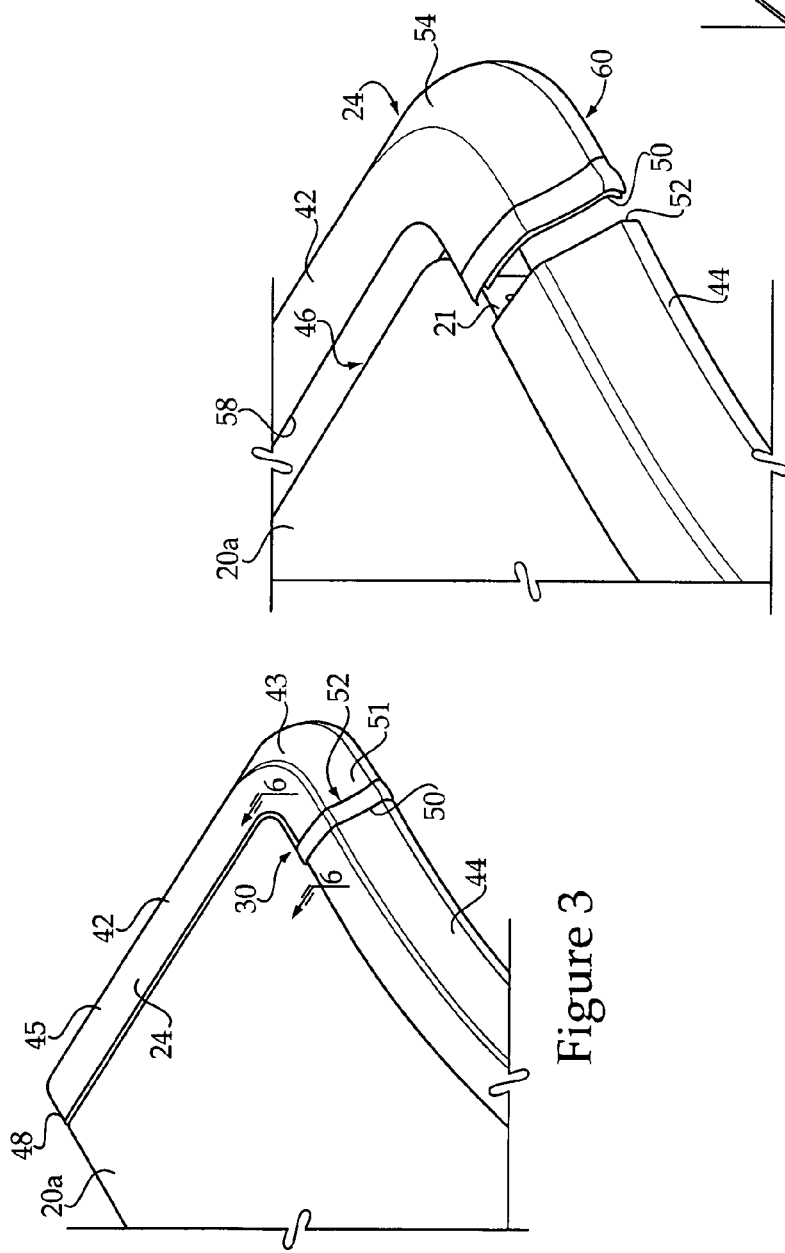
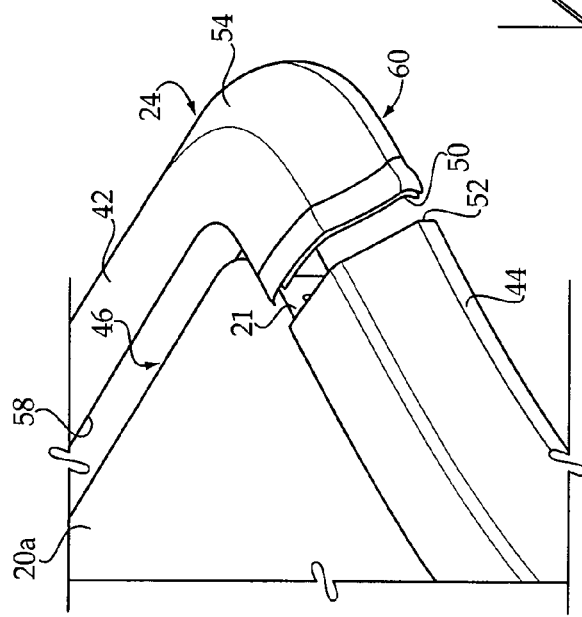
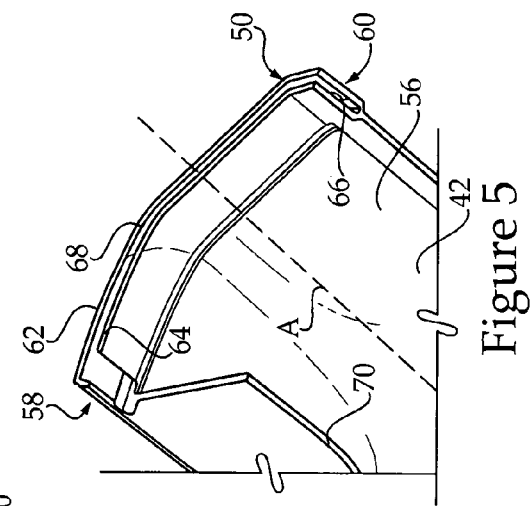

MACHINE HAVING TRIM PIECE ASSEMBLY WITH REDUCED DISCORDANCE AND METHOD

TECHNICAL FIELD

The present disclosure relates generally to trim components and trim piece assemblies of the type used in mounting to a body of a machine, and relates more particularly to reducing discordance among a plurality of components of a molded trim piece assembly via a component configuration pattern and a joint configuration pattern thereof.

BACKGROUND

Trim pieces and trim assemblies for machines have long been known. Fender flares, edge protectors and a wide variety of other trim types are well known and widely used. In some instances, trim is coupled with a machine body when the machine is assembled. Alternatively, certain types of trim are available as optional or substitute components. Manufacturers commonly design trim which is specific to certain machine configurations, the designs of which may be relatively complex. To accommodate packaging constraints and the like for trim having relatively complex, three-dimensional shapes, it is common for trim to be formed from a plurality of separate components.

Trim is commonly intended to serve both ornamental and functional purposes. Depending upon intended service environment, fender flares or fender extensions of various configurations may be used on a machine to inhibit splashing of water and debris onto other parts of the machine, and to protect the machine from damage. A variety of types of trim for fenders have been developed over the years for mounting to machines used in relatively rugged service environments. While these types of trim have proven quite useful in their functional aspects, they may become unsightly due to suboptimal manufacturing or mounting techniques, and the service environment itself. Providing a pleasing appearance to the machine remains a common goal.

As alluded to above, machine trim is often formed from multiple components. These components are typically fitted together on a machine body to follow an existing contour of the machine, such as a fender. Since contours of the machine body may be relatively complex, the use of multiple different components, typically formed of plastic, enables the relatively complex contour to be matched by multiple components of simpler design. This tends to be easier than attempting to mold one large component in the relatively complex shape necessary to match the contour of the machine body. One drawback to using multiple components is the difficulty in getting the components to properly align and/or properly mate together when assembled and mounted on the machine.

U.S. Pat. No. 5,697,644 to Logan et al. is directed to a low-profile modular fender flare. The fender flare includes plural contour pieces which are sized to accommodate packaging of the fender flare in a container of conventional size. The contour pieces are configured for attachment to the vehicle body, each piece being configured for attachment adjacent a particular portion of a vehicle wheel opening. The concerns of Logan et al. appear primarily to have been fitting a relatively long piece into a relatively small, inexpensive package. While the design of Logan et al. appears to have been successful in this regard, the fender flare components may suffer from the aforementioned problems with regard to proper alignment and mating.

SUMMARY

In one aspect, a method of reducing discordance among a plurality of components of a molded trim piece assembly for a machine includes a step of establishing a component configuration pattern for the plurality of components which is adapted to mitigate deformation of the plurality of components. The method further includes a step of establishing a joint configuration pattern for at least one joint between the plurality of components which is adapted to mitigate misalignment between the plurality of components at the at least one joint. The method still further includes a step of making each of the plurality of components according to the component configuration pattern and according to the joint configuration pattern.

In another aspect, a machine includes a frame, a plurality of ground engaging propulsion elements coupled with the frame and a body coupled with the frame. The machine further includes a molded trim piece assembly configured to mount to the body and including a plurality of components having a component configuration pattern which is adapted to mitigate deformation of the plurality of components. Each of the components further has a joint configuration pattern adapted to mitigate misalignment at a joint between the plurality of components, when mounted to the body.

In still another aspect, a molded trim piece assembly configured to mount to a machine body includes a plurality of components having a disassembled state and an assembled state and having a compound trim axis in the assembled state. Each of the plurality of components is shaped to inhibit discordance among the plurality of components when coupled together in the assembled state. Each of the plurality of components is shaped according to a component configuration pattern adapted to mitigate deformation of the plurality of components. The plurality of components include at least one joint therebetween and are shaped according to a joint configuration pattern adapted to mitigate misalignment between the plurality of components at the at least one joint when the plurality of components are coupled together in the assembled state and mounted to the machine body.

BRIEF DESCRIPTION OF THE DRAWINGS

FIG. 3 is a close-up view of a fender and a molded trim piece assembly therefor, according to one embodiment;

FIG. 4 is another close-up view of a fender and a molded trim piece assembly therefor, according to one embodiment;

FIG. 5 is a partial view of a molded trim piece assembly, according to one embodiment;

DETAILED DESCRIPTION

Figure 1:
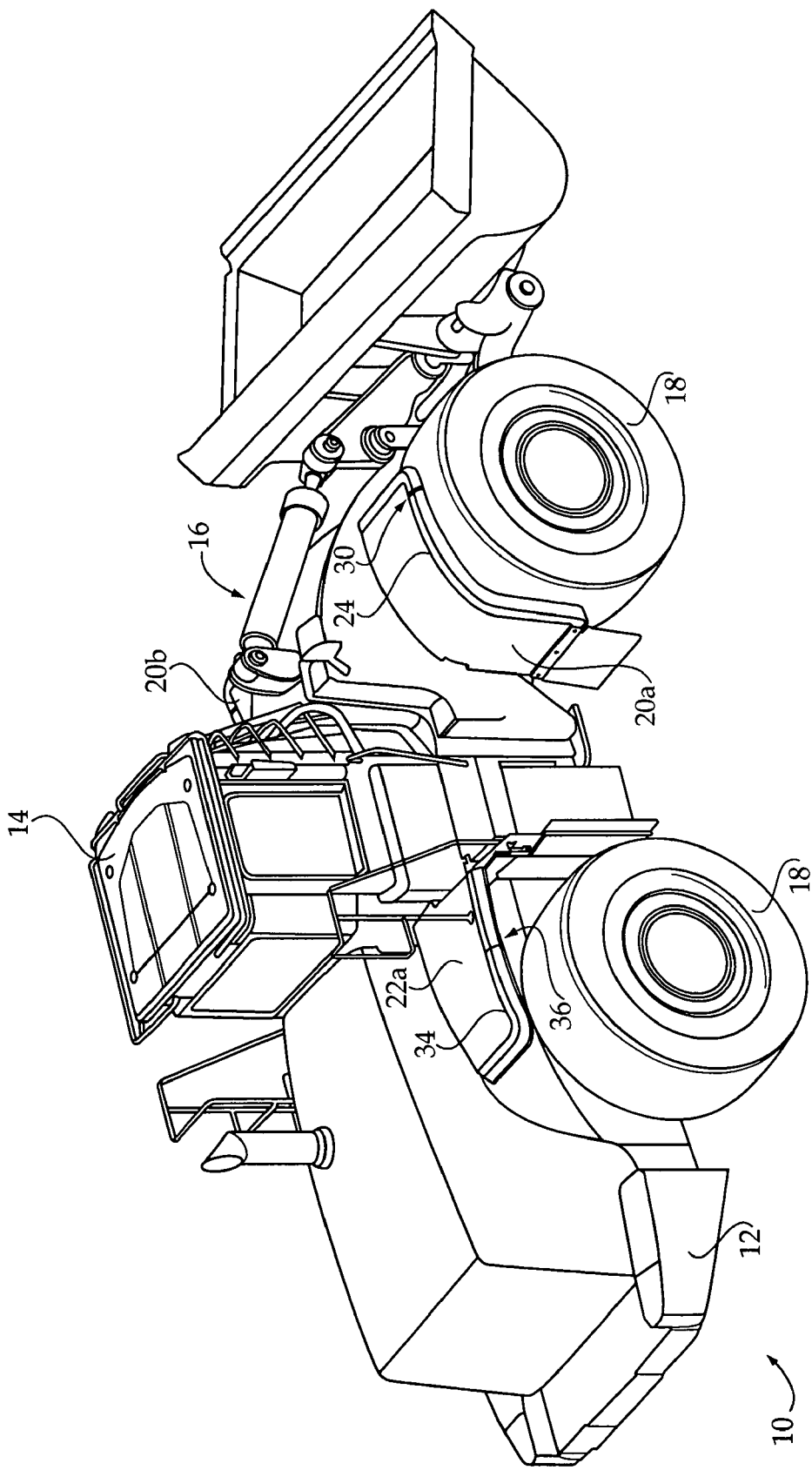
FIG. 1 is a pictorial view of a machine according to one embodiment.

Referring to FIG. 1, there is shown a machine 10 according to one embodiment. Machine 10 may include a frame 12 and a body 14 coupled with frame 12 that includes, for example, an operator cab. Machine 10 may further include a plurality of ground engaging propulsion elements 18 coupled with frame 12. Machine 10 is shown as a wheel loader having an implement system 16 coupled with frame 12 in a conventional manner. It should be appreciated, however, that a variety of machines other than wheel loaders are considered within the scope of the present disclosure. For instance, machine 10 might be a track-type loader, a wheel or track-type tractor, a backhoe, a motor grader, an excavator, a compactor, a paver, an off-highway truck or even an on-highway machine such as an on-highway truck. Body 14 may further include a set of front fenders 20*a* and 20*b*, and a set of back fenders 22*a* and 22*b*. Each of fenders 20*a-b* and 22*a-b* may include a molded trim piece assembly 24 and 34, respectively, mounted thereon. In the illustrated embodiment, molded trim piece assemblies 24 and 34 serve as fender extensions for fenders 22*a* and 22*b*, although the present disclosure is not thereby limited. As will be further apparent from the following description, each of molded trim piece assemblies 24 and 34 may be specially configured to ensure optimal functionality and aesthetic appeal when mounted to machine 10.

Figure 2:
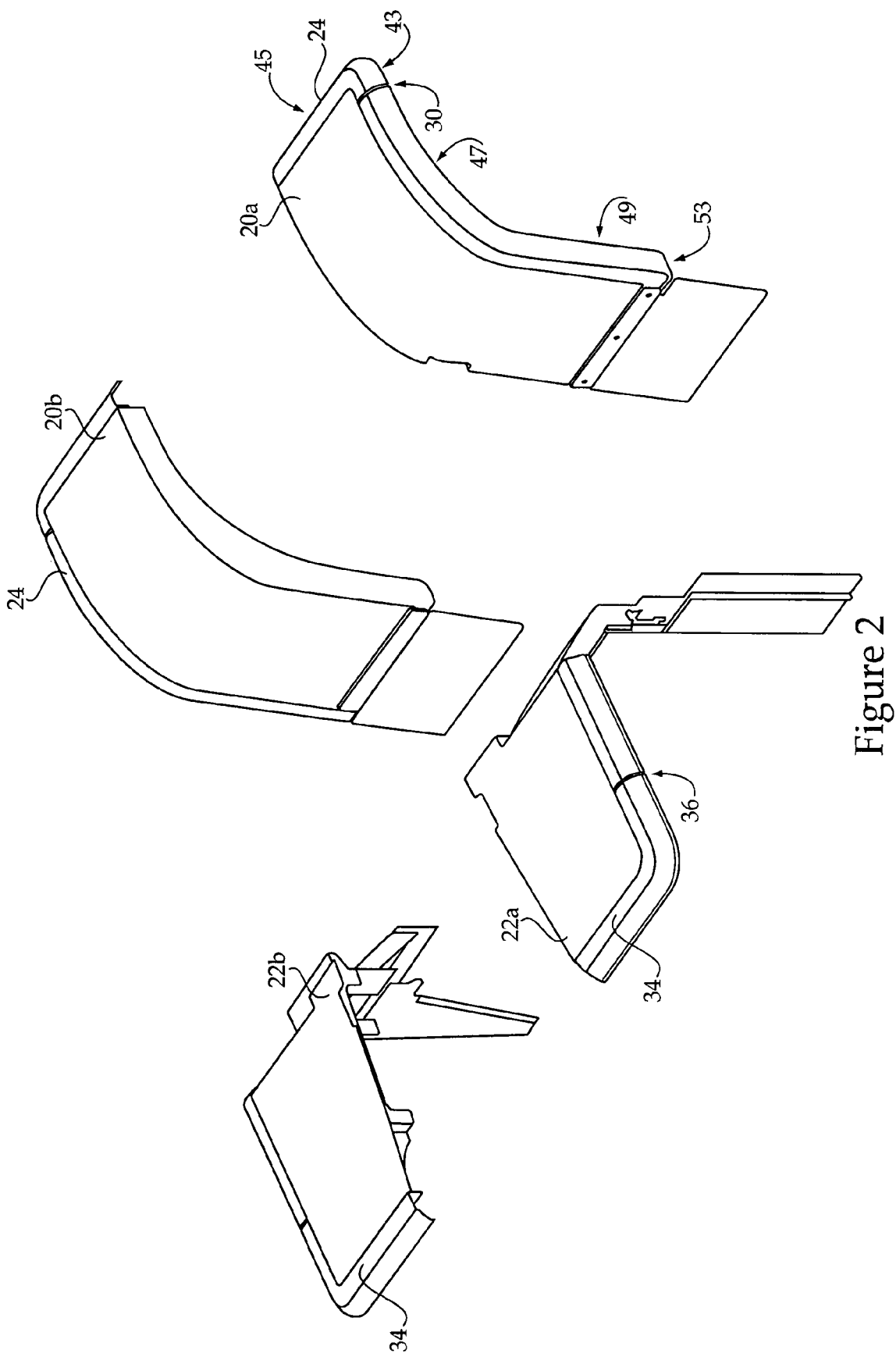
FIG. 2 is a pictorial view of a portion of the machine of FIG. 1.

Referring also to FIG. 2, there are shown front fenders 20*a* and 20*b* and back fenders 22*a* and 22*b* in a view where they are disassembled from other components of machine 10. Each trim piece assembly 24 and 34 may be formed from molded plastic or similar material in one embodiment. It has been observed that molded plastic parts may warp, shrink or otherwise become deformed after manufacturing, particularly during storage. Temperature fluctuations during use can also cause part deformation. It is common for a relatively large number of molded trim piece assemblies to be manufactured in a manufacturing run, then stored for an indefinite time with the expectation that they will later be mounted on machines, at machine assembly or even after a machine has been placed in the field. Due to the warping, etc., which can occur during storage, as well as manufacturing tolerances, technicians are often provided components of trim piece assemblies which do not fit together as intended, do not mount on the machine properly or align as intended with parts of a machine body, or which are simply unsightly when mounted on a machine. Even where the components fit and align properly once mounted, over time or in response to temperature fluctuations, they can become warped or misaligned. One further issue encountered by technicians attempting to assemble molded trim piece assemblies to a machine is misalignment at joints between the different components of the molded trim piece assembly. Deformation of components of trim piece assemblies and joint misalignment can affect the ease with which trim piece assemblies are assembled and mounted, as well as negatively impacting aesthetic appeal, functionality and even field durability.

To address these and other concerns, each molded trim piece assembly 24 and 34 of machine 10 may be made according to a component configuration pattern which is adapted to mitigate deformation of a plurality of separate components of each molded trim piece assembly. In other words, the component configuration pattern of each molded trim piece assembly 24 and 34 may be such that deformation, such as warping or shrinking during storage, warping or shrinking after removal from a mold, etc., will tend to be less severe than that associated with other known trim piece assemblies. Thus, components of trim piece assemblies 24 and 34, further described herein, can be expected to remain closer in shape and size to specified shapes and sizes even after relatively long periods of storage than that which is expected for known designs. Components of trim piece assemblies 24 and 34 may also be less sensitive to warping, shrinking and other forms of deformation when coupled together in an assembled state and mounted to body 14. In addition, the individual components may be relatively easy and inexpensive to replace given their size, configuration, etc., as opposed to replacing an entire fender or relatively more complex trim piece.

Each trim piece assembly 24 and 34 may also be made according to a joint configuration pattern adapted to mitigate misalignment at a joint between components of each molded trim piece assembly 24 and 34, when coupled together in an assembled state and mounted to body 14. In FIGS. 1 and 2, a joint 30 is shown in trim piece assembly 24 for front fender 20*a*, whereas another joint 36 is shown in trim piece assembly 34 for back fender 22*a*. As further discussed herein, a greater number of joints might be used in trim piece assemblies 24 and 34 in other embodiments. Components of trim piece assemblies 24 and 34 can be expected to be more tolerant, aesthetically and functionally, of misalignment between components at joints 30 and 36, than what would be expected with known designs.

Referring also to FIG. 3, there is shown a close-up view of molded trim piece assembly 24 mounted on fender 20*a*. Much of the following description focuses on trim piece assembly 24, however, it should be considered applicable to any trim piece assembly according to the present disclosure except where otherwise indicated. As mentioned above, molded trim piece assembly 24 may include a plurality of components, including a first component 42 and at least one other component 44. Component 42 may include a first end 48 and a second end 50, and may be shaped such that it is predominantly straight, including a relatively longer straight portion 45 which transitions to a curving portion 43, which in turn transitions to a second, relatively shorter, straight portion 51. Component 44 may include a first end 52 and a second end 53, shown in FIG. 2, opposite first end 52. Component 44 may be shaped such that it also includes a straight portion 49 transitioning with a curving portion 47.

Referring also to FIG. 4, there are shown components 42 and 44 and fender 20*a*, but with components 42 and 44 in a disassembled state as opposed to the assembled state shown in FIG. 3. In one embodiment, each of components 42 and 44 includes an end shape corresponding to the aforementioned joint configuration pattern. In the version shown, component 44 includes a male end shape at end 52 and component 42 includes a female end shape at end 50. It may further be noted that fender 20*a* includes an outer edge 46, and a mounting flange 21 extending generally along and depending downwardly from outer edge 46. Trim piece assembly 24 may include an inner edge 58 which is configured to align with outer edge 46 when trim piece assembly 24 is mounted to fender 20*a*, and extends generally in parallel with outer edge 46 of fender 20*a*.

FIGS. 3 and 4 illustrate only one of front fenders 20*a* and 20*b* and corresponding trim piece assembly 24. It should be appreciated, however, that the present description is similarly applicable to the other molded trim piece assemblies and fenders described in connection with machine 10, except where otherwise indicated. The trim piece assembly 24 associated with front fender 20*b* may have a configuration similar to that of the trim piece assembly 24 shown in FIGS. 3 and 4, but may be a mirror image thereof. Likewise, molded trim piece assemblies 34 for back fenders 22*a* and 22*b* may be mirror images of one another. Further, while machine 10 is depicted in FIG. 1 as having four fender extensions (molded trim piece assemblies 24 and 34) other machine embodiments according to the present disclosure might include only two fender extensions. In still other embodiments, trim piece assemblies according to the present disclosure might be used which are not fender extensions. Further still, for certain machines only a single trim piece assembly or more than four trim piece assemblies might be used. In any event all, or less than all, of the first, second, third and fourth fender extensions 24 and 34 illustrated in FIG. 1 may be formed according to the component configuration pattern and the joint configuration pattern described herein.

Turning to FIG. 5, there is shown a partial view of component 42 of trim piece assembly 24, illustrating certain additional features thereof. In one embodiment, component 42 may include an extension element 68 configured to extend outwardly from fender 20a when mounted thereon and having an inner edge 58 configured to align with machine body 14 as described above. Extension element 68 may further include an outer edge 60 oriented parallel inner edge 58, and also may include a sloping profile from inner edge 58 toward outer edge 60. The sloping profile is also evident in FIGS. 3 and 4, where an outer surface 54 of component 42 is shown sloping away from inner edge 58 toward outer edge 60. It will be noted that only a portion of extension element 68 has a sloping profile in the FIG. 3 embodiment. In other versions, all of extension element 68 or no part of extension element 68 might include a sloping profile. Component 42 may further include an inner surface 56 generally having a profile parallel to that of outer surface 54, as extension element 68 will typically, although not necessarily, have a uniform thickness.

Component 42 may further include a mounting element 70 which may have a planar configuration and extends downwardly from extension element 68. Mounting element 70 may be adapted for mounting component 42, and hence molded trim piece assembly 24, to fender 20a. In one embodiment, extension element 68 may have an orientation, or an average orientation, about a compound longitudinal trim axis A of trim piece assembly 24 which is different from an orientation or average orientation of mounting element 70 about compound trim axis A. It should be appreciated that component 44 may also include an extension element and a mounting element having configurations and relative orientations similar to those shown in connection with component 42. Since, however, component 44 aligns with and mounts to a portion of fender 20a which is different from the portion of fender 20a that component 42 aligns with and mounts to, the actual shape and size of the extension element and mounting element of component 44 may differ from the actual shape, size, etc. of extension element 68 and mounting element 70. It should further be appreciated that components 42 and 44 may be configured to mate together by mating their corresponding extension elements only, but in other embodiments could additionally or alternatively mate together via their mounting elements. In one embodiment, mounting element 70 may include a predetermined hole pattern (not shown) for receiving mounting fasteners or the like which couple component 42 with flange 21.

As mentioned above, component 42 may have an end shape which is configured to mate component 42 with component 44. The subject end shape, at end 50 for example, may be defined by a first end wall 62 and a second end wall 64 which are connected with or part of extension element 68 and define a channel 66. When component 42 is mated with adjoining component 44, end 52 of component 44 may fit within channel 66. In particular, end 52 may fit within channel 66 to mate component 44 with component 42 at joint 30 over a range of joint alignment states when components 42 and 44 are coupled together in an assembled state and mounted to fender 20a of body 14. The range of joint alignment states will, among other things, desensitize the function and appearance of joint 30 to temperature induced warping and misalignment.

Figure 6:
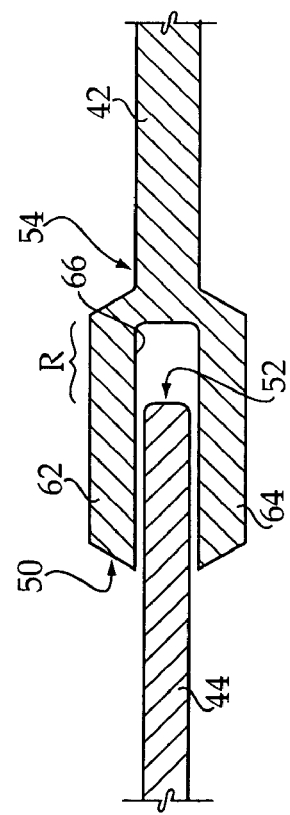
FIG. 6 is a sectioned view taken along line 6-6 of FIG. 3.

Referring also to FIG. 6, there is shown a sectioned view of components 44 and 42, taken approximately along line 6-6 of FIG. 3. It may be noted from FIG. 6 that component 42 includes a female end shape at end 50, having a C-shaped cross-section, whereas component 44 has a male end shape having a rectangular cross-section. It will also be readily apparent that components 42 and 44 may mate together over a range of joint alignment states, such that end 52 of component 44 may be positioned at a range of locations within channel 66, shown via range "R" in FIG. 6. Regardless of the particular positioning of end 52 within channel 66, the general outward appearance of trim piece assembly 24 will be generally the same. Further, by forming components 42 and 44 as shown, misalignment between outer surface 54 of component 42 and another outer surface 59 of component 44 can be lessened or eliminated. Thus, misalignment in both a horizontal aspect and a vertical aspect can be compensated for by utilizing the joint configuration disclosed herein. Many earlier designs, such as Logan et al., described above, have components with end shapes such that the components can mate only at a single joint alignment state. Such earlier designs are less able, if at all, to accommodate imperfections or variability in joint alignment or changes over time than trim piece assemblies according to the present disclosure.

Returning to FIG. 2, another joint 36 is shown in trim piece assembly 34, for fender 22a. Joint 36 may have a configuration similar to that of joint 30, with respect to the shapes of components and mating over a range of joint alignment states between components of trim piece assembly 34. It should be appreciated that any trim piece assemblies according to the present disclosure may include more than one joint between components. In other words, rather than two components and one joint, each of trim piece assemblies 24 and 34 may include more than two components and more than one joint.

By forming joints between the respective components of a trim piece assembly for a machine in the manner described herein, misalignment between the respective components is mitigated. Providing for a range of joint alignment states over which components 42 and 44 may mate with one another, as depicted in FIG. 6, and compensating for misalignment between surfaces 54 and 59, overcomes problems in appearance and function associated with earlier designs having inferior joint configuration patterns. Moreover, while the rectangular/C-shaped, male/female interface at joint 30 represents one practical implementation strategy, the present disclosure is not thereby limited and other joint configuration patterns might be used which would be capable of mitigating misalignment between components 42 and 44, without departing from the scope of the present disclosure.

Figure 7:
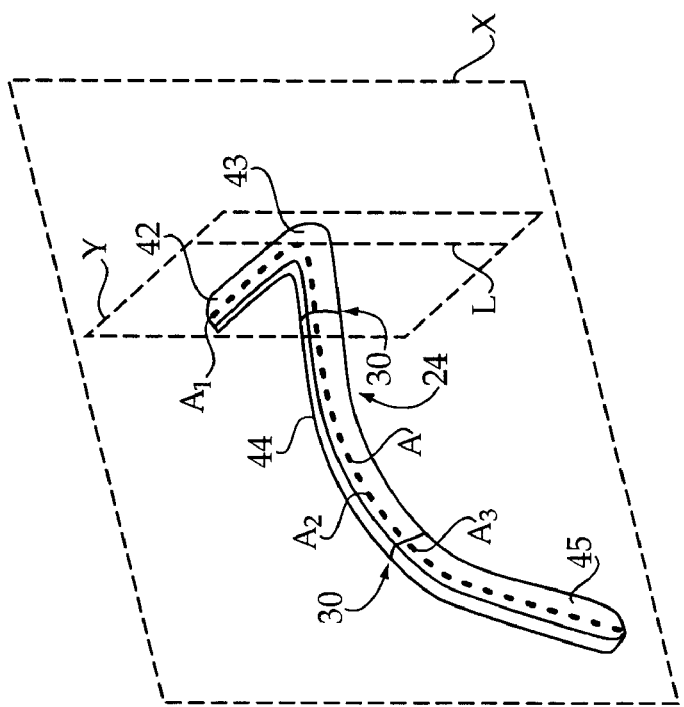
FIG. 7 is a diagrammatic view of a molded trim piece assembly, according to one embodiment.

Referring now to FIG. 7, there is shown a diagrammatic view of trim piece assembly 24, illustrating compound trim axis A. In FIG. 7, a third component 45 is shown coupled with component 44 at another joint, also labeled via reference numeral 30. Thus, as shown in FIG. 7, trim piece assembly 24 has been divided into three components rather than two. It should nevertheless be appreciated that while trim piece assemblies according to the present disclosure will by definition include at least two components, they might include any number of components greater than two and the illustration of three different components in FIG. 7 is not limiting. Both two-component and three-component versions of trim piece assembly 24 are shown herein, for illustrative purposes.

In one embodiment, the component configuration pattern for components 42, 44 and 45 may include a shape of each of components 42, 44 and 45 which is based at least in part on a contour of compound trim axis A. In other words, components 42, 44 and 45 may be shaped according to an orientation of compound trim axis A in 3-dimensional space. As used herein, the term "compound" should be understood to mean that trim axis A will always define at least two imaginary planes when trim piece assembly 24 is in its assembled state. Stated another way, compound trim axis A cannot be placed entirely within a single plane when trim piece assembly 24 is in its assembled state. Compound trim axis A may include a plurality of trim axis segments, $A_1$, $A_2$ and $A_3$. Trim axis A defines a first plane Y and a second plane X. In the illustrated embodiment, plane Y is oriented orthogonal plane X. Segment $A_1$ is defined by component 42 and lies at least predominately in plane Y. Segments $A_2$ and $A_3$ are defined by components 44 and 45, respectively, and each lies at least predominantly in plane X. Configuring components 42, 44 and 45 such that the corresponding trim axis segments $A_{1-3}$ each lie predominantly in planes X and Y approximately as shown in FIG. 7 is one example of shaping components 42, 44 and 45 to mitigate deformation, as further explained hereinbelow.

INDUSTRIAL APPLICABILITY

Referring to the drawings generally, as discussed above many trim piece assemblies and related components known from earlier strategies suffer from problems resulting from component deformation prior to mounting on a machine. Relatively long periods of storage and/or shipping can subject components to temperature extremes and wide temperature swings. When technicians attempt to assemble certain known trim piece assemblies to a machine they often discover that deformation such as warping of the components, shrinkage, etc., has occurred during storage or as a result of sub-optimal manufacturing. As a result, the parts may not mount to the machine as desired, rendering them unsightly, difficult to mount and in some instances functionally inferior. A related problem is the tendency for trim piece components to fail to properly align at joints between components of the trim piece assembly, resulting in a relatively unsightly gap or other misalignment issues at the joint.

The present disclosure addresses these and other concerns by providing a unique strategy for reducing discordance among components of molded trim piece assemblies, such as trim piece assemblies 24 and 34. As used herein, the term "discordance" should be understood to mean lack of agreement in structure, profile, form, alignment, sizing, shape and a variety of other factors which may result in trim piece assemblies being unsightly or functionally compromised when installed in their intended service environment. For example, where one or more components of a trim piece assembly becomes bent during storage, but was intended to be straight, the trim piece assembly could be understood to have discordance among its components. Similarly, where one or more components of a trim piece assembly shrinks during storage, the trim piece assembly could be said to have discordance among its components. A gap between components at a joint would be still another example of discordance.

Discordance among components of a molded trim piece assembly such as assembly 24 or 34 may be reduced by establishing the component configuration pattern and joint configuration pattern discussed herein for a plurality of components of a molded trim piece assembly 24, 34, then making each of the plurality of components according to the component configuration pattern and according to the joint configuration pattern. In one embodiment, establishing a component configuration pattern for components 42 and 44, and component 45 in a 3-component design, as in FIG. 7, may include establishing a shape for each of the components which is based on the contour of compound trim axis A, as mentioned above. Similarly, establishing the component configuration pattern might also include establishing a component size, such as length, width, etc. Still further examples of establishing a component configuration pattern may include establishing a relative thickness of portions of the respective components, for example to inhibit warping, or selecting a location for one or more of joints 30.

It may be noted from FIG. 7 that joint 30 between components 42 and 44 is spaced from a curving portion of trim axis segment $A_1$, corresponding to curved portion 43 of component 42. A line L identifies an intersection of planes Y and X, extending through curved portion 43 and intersecting trim axis segment $A_1$. The subject joint 30 between components 42 and 44 is located off of the curving portion of trim axis segment $A_1$. Thus, the location of the subject joint 30 is based on the contour of compound trim axis A, as the selected joint location is based on the orientation or path of compound trim axis A in 3-dimensional space. By locating joint 30 between components 42 and 44 as shown, relatively straight portions of the respective components can be aligned and mated at the respective joint 30. If joint 30 between components 42 and 44 were instead located at or near the intersection of line L and axis segment $A_1$, components 42 and 44 would need to have tapered ends to properly fit together. If components 42 or 44 are deformed during storage, etc., locating joint 30 between components 42 and 44 off of the curved portion 43 can thus mitigate the deformation since the relatively simpler component configurations, for example non-tapered ends, may be less affected by warping, etc., than would relatively more complex component configurations such as tapered ends. Establishing a location for joint 30 between components 42 and 44 is thus one example of establishing a component configuration pattern as described herein, and forming components 42 and 44 with shapes based on the established location for joint 30 between components 42 and 44 is one example of making components 42 and 44 according to the component configuration pattern.

As mentioned above, another concern in establishing a component configuration pattern which mitigates deformation may include component length and component complexity. Relatively more complex component shapes tend to be relatively more susceptible to problems relating to warping, shrinking, etc. Likewise, relatively longer components may be relatively more susceptible to warping. Accordingly, in establishing a location for joint 30 between components 42 and 44, the resulting length of components 42 and 44 may also be considered. Establishing a component configuration pattern may also include selecting the number of components which will be used for a given trim piece assembly. It will thus be appreciated that numerous different factors may be balanced when establishing component lengths, shapes, thickness, profiles and other aspects of a component configuration pattern which is adapted to mitigate deformation.

It will be recalled that reducing discordance among components of trim piece assembly 24, 34 may also include establishing a joint configuration pattern for at least one joint such as joint 30 which is adapted to mitigate misalignment between the respective components 42 and 44. End shapes for components 42 and 44 which are configured such that components 42 and 44 can mate across a range of joint alignment states may be selected, as described above. Establishing a joint configuration pattern may also include establishing end shapes for components 42 and 44 as described above, including the female end shape for component 42 which has a C-shaped cross section in a plane parallel compound trim axis A, and establishing a male end shape for component 44 having a rectangular shaped cross-section in the plane. The subject plane may correspond to plane X, as in FIG. 7.

Once an appropriate component configuration pattern and joint configuration pattern are established, as described herein, each of the plurality of components 42, 44 and 45, for example, may be made according to the component configuration pattern and according to the joint configuration pattern. In one embodiment, each of the plurality of components 42, 44 and 45 may be injection molded. In other embodiments, rather than injection molding, the respective components might be made by another suitable process. Shaping each of the plurality of components according to the component configuration pattern and according to the joint configuration pattern may occur either when the components are initially formed, or as a subsequent processing step in manufacturing.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims.

What is claimed is:

1. A machine comprising:
    a frame;
    a plurality of ground engaging propulsion elements coupled with the frame;
    a body coupled with the frame;
    a molded trim piece assembly having a compound longitudinal trim axis and being mounted to the body, the molded trim piece assembly including a plurality of components each having a straight portion;
    each of the plurality of components being shaped according to a component configuration pattern adapted to mitigate deformation of the plurality of components, whereby a joint between the plurality of components is located such that the straight portions mate together at the joint; and
    each of the plurality of components further being shaped according to a joint configuration pattern adapted to mitigate misalignment at the joint, whereby the plurality of components mate together at the joint over a range of joint alignment states.

2. The machine of claim 1 wherein the body includes a fender and wherein the molded trim piece assembly includes a fender extension configured to mount to the fender.

3. The machine of claim 2 wherein the compound trim axis defining a plurality of different planes and including a plurality of trim axis segments each defined by one of the plurality of components and being located at least predominantly in a different one of the plurality of different planes.

4. The machine of claim 3 wherein the compound trim axis defines a first plane and a second plane which is orthogonal to the first plane.

5. A machine of comprising:
    a frame;
    a plurality of ground engaging propulsion elements coupled with the frame;
    a body coupled with the frame; and
    a molded trim piece assembly configured to mount to the body and including a plurality of components having a component configuration pattern adapted to mitigate deformation of the plurality of components and each of the components further having a joint configuration pattern adapted to mitigate misalignment at a joint between the plurality of components, when mounted to the body;
    wherein the body includes a fender and wherein the molded trim piece assembly includes a fender extension configured to mount to the fender;
    wherein the molded trim piece assembly includes a compound trim axis defining plurality of different planes and including a plurality of trim axis segments each defined by one of the plurality of components and being located at least predominantly in a different one of the plurality of different planes;
    wherein the compound trim axis defines a first plane and a second plane which is orthogonal to the first plane; and
    wherein each of the plurality of components includes an extension element having an inner edge configured to align with an edge of the fender and an outer edge oriented parallel the inner edge, the extension element having a sloping profile from the inner edge toward the outer edge, each of the plurality of components further including a mounting element extending downwardly from the extension element which is adapted for mounting the corresponding component to the fender.

6. The machine of claim 5 wherein a first one of the plurality of components includes a first end having a female end shape corresponding to the joint configuration pattern and a second one of the plurality of components includes a second end having a male end shape also corresponding to the joint configuration pattern, and wherein the first end is configured to mate with the second end at the joint between the components over the range of joint alignment states.

7. The machine of claim 6 wherein the first end includes a C-shaped cross section in a plane parallel the compound trim axis, and wherein the second end includes a rectangular cross section in the plane.

8. The machine of claim 7 wherein:
    the body includes a set of front fenders and a set of back fenders, and the molded trim piece assembly is a first fender extension for a first one of the front fenders;
    the machine further comprises a second fender extension for a second one of the front fenders which is a mirror image of the first fender extension, and a third fender extension for a first one of the back fenders and a fourth fender extension for a second one of the back fenders which is a mirror image of the third fender extension;
    each of the third and fourth fender extensions comprises a molded trim piece assembly with a plurality of components, each respective plurality of components having a component configuration pattern which is adapted to mitigate deformation of the plurality of components and a joint configuration pattern adapted to mitigate misalignment at a joint between the plurality of components.

9. A molded trim piece assembly configured to mount to a machine body comprising:
    a plurality of components having a disassembled state and an assembled state and having a compound longitudinal trim axis in the assembled state, each of the plurality of components being shaped to inhibit discordance among the plurality of components when coupled together in the assembled state, and each having a straight portion;
    wherein the plurality of components are each shaped according to a component configuration pattern adapted to mitigate deformation of the plurality of components, whereby a joint between the plurality of components is located such that the straight portions mate together at the joint when the plurality of components are coupled together in the assembled state and mounted to the machine body; and wherein the plurality of components are shaped according to a joint configuration pattern adapted to mitigate misalignment between the plurality of components at the joint, whereby the plurality of components mate together at the joint over a range of joint alignment states when coupled together in the assembled state and mounted to the machine body.

10. A molded trim piece assembly configured to mount to a machine body comprising:

a plurality of components having a disassembled state and an assembled state and having a compound trim axis in the assembled state, each of the plurality of components being shaped to inhibit discordance among the plurality of components when coupled together in the assembled state;

wherein the plurality of components are each shaped according to a component configuration pattern adapted to mitigate deformation of the plurality of components;

wherein the plurality of components include at least one joint therebetween and are shaped according to a joint configuration pattern adapted to mitigate misalignment between the plurality of components at the at least one joint when the plurality of components are coupled together in the assembled state and mounted to the machine body;

wherein each of the plurality of components includes an extension element having an inner edge configured to align with the machine body, an outer edge oriented parallel the inner edge, and a sloping profile from the inner edge toward the outer edge, each of the plurality of components further including a mounting element extending downwardly from the extension element and being adapted for mounting the molded trim piece assembly to the machine body; and wherein a first one of the plurality of components includes a first end having a female end shape with a C-shaped cross section and a second one of the plurality of components includes a second end having a male end shape with a rectangular shaped cross section, the first end being configured to mate with the second end at the at least one joint over a range of joint alignment states when the plurality of components are coupled together in the assembled state and mounted to the machine body.

11. The molded trim piece assembly of claim 10 wherein the molded trim piece assembly includes a fender extension configured to mount to a fender of the machine and the compound trim axis defines a first plane and a second plane oriented orthogonal to the first plane, the compound trim axis further including a first trim axis segment defined by the first one of the plurality of components and a second trim axis segment defined by the second one of the plurality of components, and wherein the first trim axis segment is located at least predominantly in the first plane and the second trim axis segment is located at least predominantly in the second plane.

* * * * *

UNITED STATES PATENT AND TRADEMARK OFFICE
CERTIFICATE OF CORRECTION

| | | |
|---|---|---|
| PATENT NO. | : 8,070,213 B2 | Page 1 of 1 |
| APPLICATION NO. | : 12/157095 | |
| DATED | : December 6, 2011 | |
| INVENTOR(S) | : Egging et al. | |

It is certified that error appears in the above-identified patent and that said Letters Patent is hereby corrected as shown below:

In the Specification

Column 5, line 38, delete "20awhich" and insert -- 20a which --.

In the Claims

Column 9, line 56, in Claim 5, delete "A machine of comprising:" and insert -- A machine comprising: --.

Column 10, line 5, in Claim 5, delete "defining plurality" and insert -- defining a plurality --.

Signed and Sealed this
Fourteenth Day of July, 2015

Michelle K. Lee
*Director of the United States Patent and Trademark Office*